(12) United States Patent
Wang et al.

(10) Patent No.: US 10,001,872 B2
(45) Date of Patent: Jun. 19, 2018

(54) IN-CELL TOUCH SCREEN AND DISPLAY DEVICE

(71) Applicants: BOE Technology Group Co., Ltd., Beijing (CN); Beijing BOE Optoelectronics Technology Co., Ltd., Beijing (CN)

(72) Inventors: Haisheng Wang, Beijing (CN); Xue Dong, Beijing (CN); Xiaochuan Chen, Beijing (CN); Yingming Liu, Beijing (CN); Xiaoliang Ding, Beijing (CN); Shengji Yang, Beijing (CN); Weijie Zhao, Beijing (CN); Hongjuan Liu, Beijing (CN); Wei Liu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 15/122,086

(22) PCT Filed: Sep. 17, 2015

(86) PCT No.: PCT/CN2015/089857
§ 371 (c)(1),
(2) Date: Aug. 26, 2016

(87) PCT Pub. No.: WO2016/131254
PCT Pub. Date: Aug. 25, 2016

(65) Prior Publication Data
US 2017/0017333 A1   Jan. 19, 2017

(30) Foreign Application Priority Data
Feb. 17, 2015   (CN) .......................... 2015 1 0085337

(51) Int. Cl.
G06F 3/041 (2006.01)
G06F 3/044 (2006.01)
G02F 1/1333 (2006.01)

(52) U.S. Cl.
CPC ........ G06F 3/0416 (2013.01); G02F 1/13338 (2013.01); G06F 3/044 (2013.01); G06F 3/0412 (2013.01); G06F 2203/04103 (2013.01)

(58) Field of Classification Search
CPC ...... G06F 3/0416; G06F 3/0412; G06F 3/044; G06F 2203/04103; G02F 1/13338
See application file for complete search history.

(56) References Cited

U.S. PATENT DOCUMENTS

2011/0157043 A1   6/2011  Lai et al.
2015/0109248 A1*  4/2015  Tokai ...................... G06F 3/044
                                               345/174

FOREIGN PATENT DOCUMENTS

CN   102445800 A   5/2012
CN   102945106 A   2/2013
(Continued)

OTHER PUBLICATIONS

International Search Report and Written Opinion for Application Serial No. PCT/CN2015/089857, dated Feb. 17, 2015, 10 pages.

*Primary Examiner* — Abhishek Sarma
(74) *Attorney, Agent, or Firm* — Kinney & Lange, P.A.

(57) ABSTRACT

Embodiments of the present disclosure disclose an in-cell touch screen and a display device. A touch electrode arranged in the touch screen is provided with a slit at a region corresponding to a gap between two adjacent pixels, such that the slits in respective touch electrodes of the in-cell touch screen and the gaps between the touch electrodes are uniformly distributed to avoid defective problem of bright lines or dark lines present in the in-cell touch screen. Further, a strip-shaped floating electrode is further provided in the (Continued)

touch screen to be electrically connected with the touch electrode and is arranged at the a slit of the touch electrode and/or at the gap between two adjacent touch electrodes. The strip-shaped floating electrode is used to partially fill or cover the slit in the touch electrode, which can alleviate reduction in an effective area of the touch electrode due to providing the slit in the touch electrode.

20 Claims, 5 Drawing Sheets

(56) References Cited

FOREIGN PATENT DOCUMENTS

| | | |
|---|---|---|
| CN | 102955636 A | 3/2013 |
| CN | 202887152 U | 4/2013 |
| CN | 103577017 A | 2/2014 |
| CN | 203759664 A | 8/2014 |
| CN | 104062817 A | 9/2014 |
| CN | 104238222 A | 12/2014 |
| CN | 104615324 A | 5/2015 |

\* cited by examiner

IN-CELL TOUCH SCREEN AND DISPLAY DEVICE

CROSS-REFERENCE TO RELATED APPLICATION

This application is a Section 371 National Stage Application of International Application No. PCT/CN2015/089857, filed 17 Sep. 2015, entitled "IN-CELL TOUCH PANEL AND DISPLAY DEVICE", which has not yet published, and which claims priority to Chinese Application No. 201510085337.1, filed on 17 Feb. 2015, incorporated herein by reference in their entirety.

BACKGROUND OF THE INVENTION

Field of the Invention

Embodiments of the present disclosure generally relate to the touch control field, and particularly, to an in-cell touch screen and a display device.

Description of the Related Art

Presently, a conventional in-cell touch screen may detect a position where a finger touches the screen based on mutual capacitance or self-capacitance principle. For example, when the in-cell touch screen is applied to a high aperture ratio, high-advanced dimension switch (HADS) type liquid crystal screen, a common electrode may double as a touch electrode. As the common electrode in the HADS liquid crystal screen has a slit electrode structure, i.e., the common electrode is provided with a plurality of longitudinal slits at regions corresponding to respective pixels. As shown in FIGS. 1a and 1b, the touch electrodes 1 each correspond to a plurality of pixels 2 of the liquid display screen. Adjacent touch electrodes 1 are insulated from one another and each of them is provided with a plurality of longitudinal slits at the regions corresponding to respective pixels 2.

In the above in-cell touch screen, although the touch electrodes 1 each are provided with a plurality of longitudinal slits at the regions corresponding to respective pixels 2, the touch electrode 1 has different structures at a region (region A in FIG. 1a) near the gap and a region (region B in FIG. 1a) inside the touch electrode 1, thus during displaying of the in-cell touch screen, there is a difference in brightness between the region at the gap between the adjacent touch electrodes 1 and the region inside the touch electrode 1, which causes defective problem of bright lines or dark lines appearing on the display screen or the like.

SUMMARY

Accordingly, embodiments of the present disclosure provide an in-cell touch screen and a display device, for solving the defective problems of bright lines or dark lines in a displayed picture in prior arts.

Therefore, embodiments of the present disclosure provide an in-cell touch screen, comprising an upper substrate and a lower substrate that are arranged to face each other, and a plurality of touch electrodes that are independent of one another and arranged on a side of the lower substrate facing the upper substrate or on a side of the upper substrate facing the lower substrate;

each touch electrode corresponds to a plurality of pixels in the touch screen and is provided with a slit at a position corresponding to a gap between two adjacent pixels; and the touch screen further comprises a strip-shaped floating electrode that is electrically connected with a corresponding one of the touch electrodes and is arranged at a position corresponding to the slit of the corresponding touch electrode and/or at a position corresponding to a gap between two adjacent touch electrodes.

Preferably, in the above in-cell touch screen according to the embodiments of the present disclosure, the slit comprises a longitudinal slit corresponding to the gap between two adjacent pixels arranged in a row direction and a horizontal slit corresponding to the gap between two adjacent pixels arranged in a column direction.

Preferably, in the above in-cell touch screen according to the embodiments of the present disclosure, a width of the longitudinal slit is equal to a width of the gap between two adjacent columns of touch electrodes; and/or, a width of the horizontal slit is equal to a width of the gap between two adjacent rows of touch electrodes.

Preferably, in the above in-cell touch screen according to the embodiments of the present disclosure, an arrangement pattern of the longitudinal slits is configured to be the same in all the touch electrodes and/or an arrangement pattern of the horizontal slits is configured to be the same in all the touch electrodes.

Preferably, in the above in-cell touch screen according to the embodiments of the present disclosure, all the touch electrodes form a common electrode layer located on the side of the lower substrate facing the upper substrate; and the strip-shaped floating electrode is arranged in the same layer as and insulated from a data line or a gate line on the lower substrate.

Preferably, in the above in-cell touch screen according to the embodiments of the present disclosure, the strip-shaped floating electrode comprises:

a longitudinal floating electrode arranged at a position corresponding to the longitudinal slit and/or at a position corresponding to the gap between two adjacent touch electrodes arranged in the row direction; and/or a horizontal floating electrode arranged at a position corresponding to the horizontal slit and/or at a position corresponding to the gap between two adjacent touch electrodes arranged in the column direction.

Preferably, in the above in-cell touch screen according to the embodiments of the present disclosure, the strip-shaped floating electrode is not overlapped with other touch electrodes, except the touch electrode that is electrically connected with the strip-shaped floating electrode.

Preferably, the above in-cell touch screen according to the embodiments of the present disclosure further comprises:

signal lines that are arranged at positions corresponding to other longitudinal slits than the longitudinal slits where the longitudinal floating electrodes are arranged and/or at positions corresponding to other gaps between two adjacent touch electrodes arranged in the row direction than the gaps where the longitudinal floating electrodes are arranged, the signal lines being connected with the touch electrodes in a one-to-one correspondence and configured to load corresponding electrical signals to the touch electrodes connected therewith.

Preferably, in the above in-cell touch screen according to the embodiments of the present disclosure, the touch electrodes comprise touch driving electrodes and touch sensing electrodes; or the touch electrodes are configured as self-capacitance electrodes; or the touch electrodes are configured as touch driving electrodes, and the touch screen further comprises touch sensing electrodes arranged in a layer which is different from the layer where the touch driving electrodes are located.

Embodiments of the present disclosure further provide a display device comprising the in-cell touch screen as described above.

In the in-cell touch screen and display device according to the embodiments of the present disclosure, the touch electrodes of the touch screen are provided with the slits at the regions corresponding to the gaps between the two adjacent pixels so as to ensure uniform distribution of the slits in the touch electrodes and the gaps between the touch electrodes and further to avoid defective problems of bright line or dark line appearing in the in-cell touch screen. Further, the touch screen is further provided with the strip-shaped floating electrode that is electrically connected with the touch electrodes. The strip-shaped floating electrodes is arranged at the position corresponding to the slit in the touch electrodes and/or at the position corresponding to the gap between two adjacent touch electrodes. The strip-shaped floating electrode at least partially fills or covers the slit in the touch electrodes, thus the problem that the effective area of the touch electrode is reduced due to provision of the slits in the touch electrode may be alleviated.

BRIEF DESCRIPTION OF THE DRAWINGS

FIG. 1b is a structural schematic view of a touch electrode in the in-cell touch screen shown in FIG. 1a;

DETAILED DESCRIPTION OF THE EMBODIMENTS

Figure 1A:
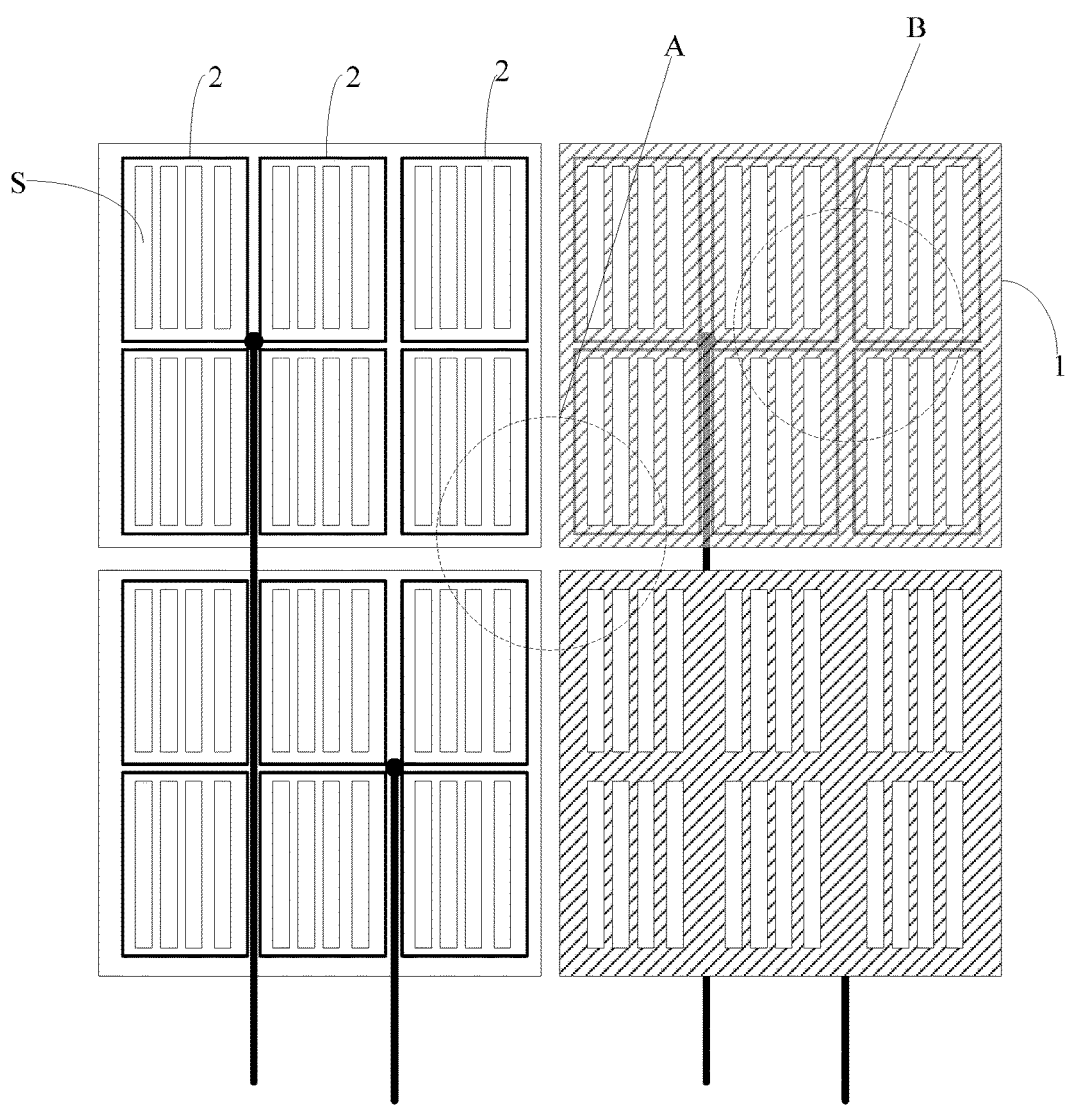
FIG. 1a is a structural schematic view of an existing in-cell touch screen.
Figure 1B:
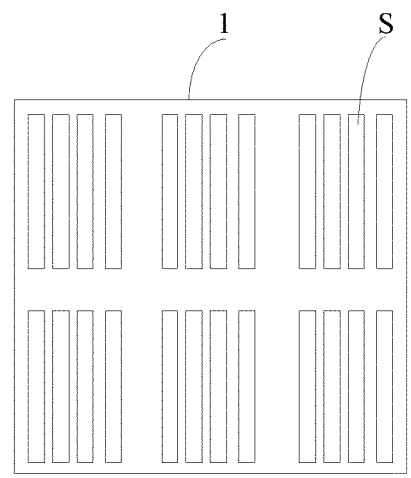

A further description of an in-cell touch screen and a display device provided according to embodiments of the present disclosure will be made in conjunction with the accompanying drawings.

In the drawings, widths and shapes of respective layers as shown do not reflect real scales, but are only intended to illustrate the content of the present disclosure.

Figure 2:
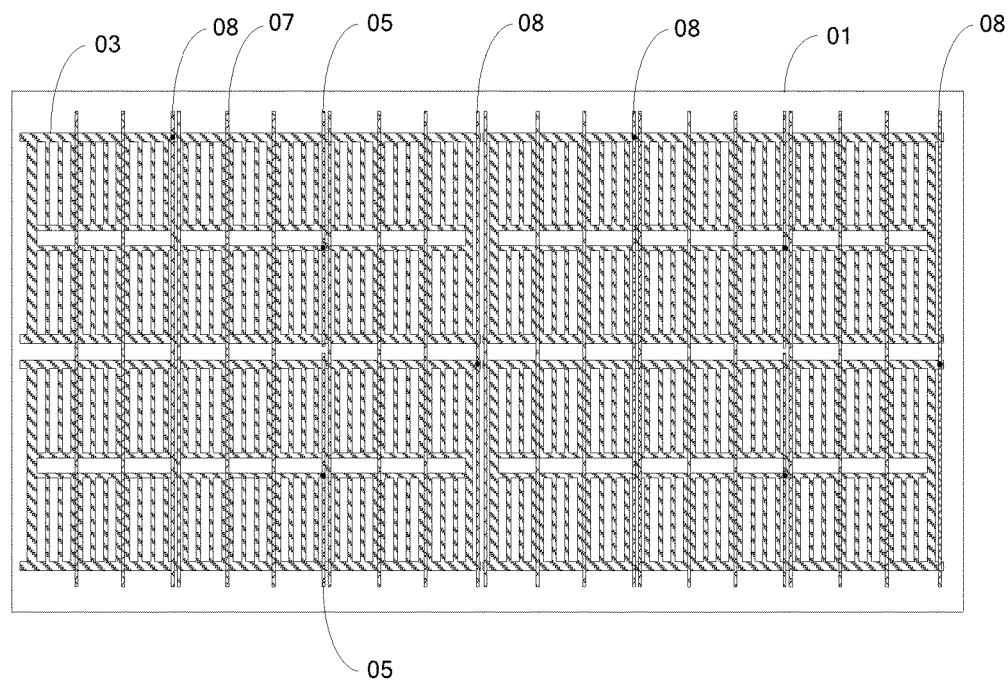
FIG. 2 is a structural schematic view of an in-cell touch screen according to an exemplary embodiment of the present disclosure.
Figure 3:
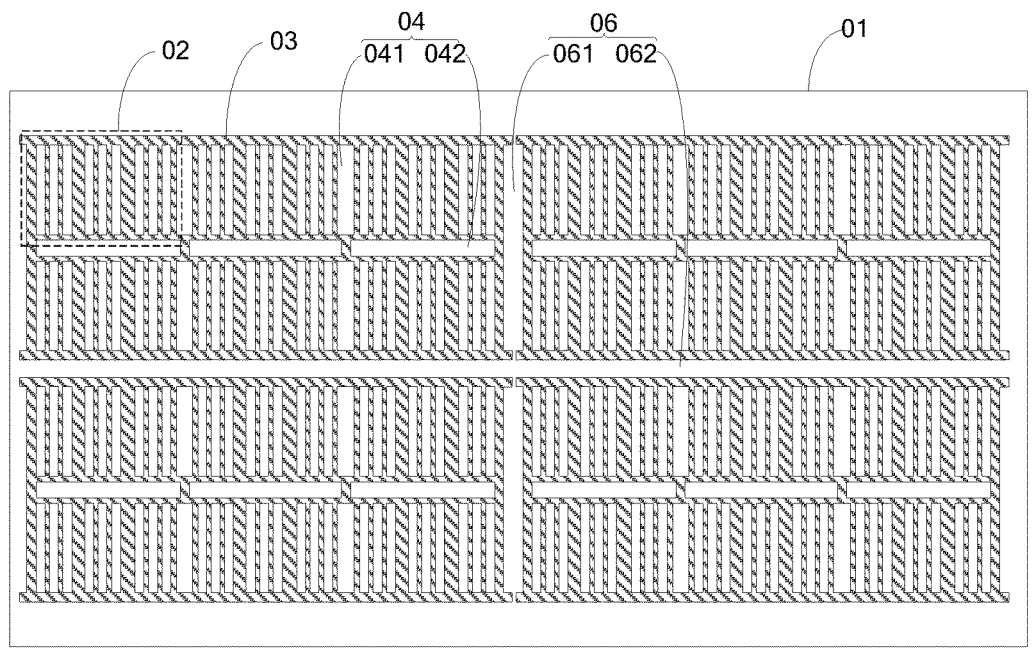
FIG. 3 is a structural schematic view of a touch electrode in an in-cell touch screen according to an exemplary embodiment of the present disclosure.
Figure 4:
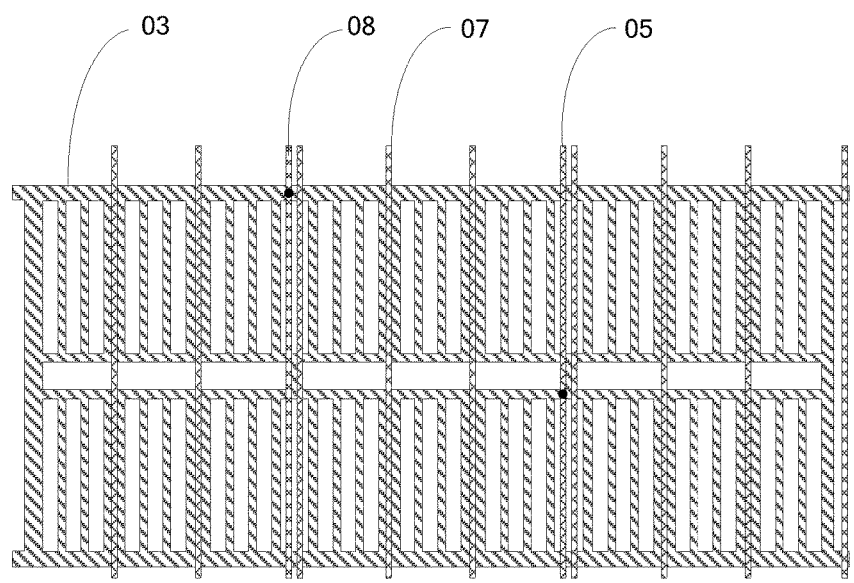
FIG. 4 is a structural schematic view of a touch electrode in the in-cell touch screen shown in FIG. 2.

An embodiment of the present disclosure provides an in-cell touch screen, as shown in FIGS. 2-4. The in-cell touch screen includes an upper substrate (not shown) and a lower substrate 01 that are arranged to face each other, and a plurality of touch electrodes 03 that are independent of one another and arranged on a side of the lower substrate 01 facing the upper substrate or on a side of the upper substrate facing the lower substrate 01. In the examples as shown in FIGS. 2-4, the touch electrodes 03 are arranged on the side of the lower substrate 01 facing the upper substrate.

In the structural schematic view of the touch electrodes as shown in FIG. 3, the touch electrodes 03 each correspond to a plurality of pixels 02 in the touch screen. FIG. 3 illustrates an example in which each touch electrode 03 corresponds to 2×3 pixels and is provided with a slit 04 at a position corresponding to a gap between two adjacent pixels 02. There is a gap 06 between two adjacent touch electrodes 03. As shown in the Figure, the touch electrode 03 has a slit structure at a region corresponding to each of the pixels 02.

As shown in FIG. 2, the touch screen further comprises a strip-shaped floating electrode 05 that is electrically connected with a corresponding touch electrode 03 and may be arranged at the slit 04 in the touch electrode 03 and/or at the gap 06 between two adjacent touch electrodes. In an example, a width of the strip-shaped floating electrode 05 is smaller than a width of the slit 04 and/or a width of the gap 06 so as to merely partially fill or cover the slit 04 and/or the gap 06.

In the in-cell touch screen according to embodiments of the present disclosure, the slits 04 are provided at positions in the touch electrodes 03 corresponding to the gaps between two adjacent pixels 02, so that the slits 04 in all touch electrodes 03 and the gaps 06 between the touch electrodes 03 are uniformly distributed, thereby avoiding the defective problem of bright lines or dark lines appearing in the in-cell touch screen.

Further, the touch screen is further provided with the strip-shaped floating electrode 05, which is electrically connected with the touch electrode 03 and is arranged at a position corresponding to the slit 04 in the touch electrode 03 and/or at a position corresponding to the gap 06 between two adjacent touch electrodes 03. By providing the strip-shaped floating electrode 05 to partially fill the slit 04 in the touch electrode 03, the problem of an effective area of the touch electrode 03 being reduced due to providing the slits 04 in of the touch electrode 03 may be mitigated.

In an embodiment, as shown in FIG. 3, the gaps 06 between the touch electrodes 03 may specifically be classified as or comprise a longitudinal gaps 061 and a horizontal gap 062. In order to obtain uniform distribution of the gaps in a vertical direction and a horizontal direction in the touch screen respectively, specifically, the slits 04 provided in the touch electrode 03, may include a longitudinal slit 041 that corresponds to the gap between two adjacent pixels 02 arranged in a row direction and a horizontal slit 042 that corresponds to the gap between two adjacent pixels 02 arranged in a column direction, as shown in FIG. 3. In order to ensure continuity of each touch electrode 03, the horizontal slit 042 and the longitudinal slit 041 do not extend to outside of or to exceed the touch electrode 03.

Preferably, in the in-cell touch screen according to embodiments of the present disclosure, in order to obtain a more uniform pattern in the layer where the touch electrodes 03 are located, a width of the longitudinal slit 041 is generally configured to be equal to a width of the gap (such as 061) between two adjacent columns of touch electrodes 03, and/or, a width of the horizontal slit 042 is generally configured to be equal to a width of the gap (such as 062) between two adjacent rows of touch electrodes 03. As an example, the widths of the gap between two adjacent columns of touch electrodes 03 and the gap between two adjacent rows of touch electrodes 03 generally is about 5 μm, and are not limited herein.

In an example, in the in-cell touch screen according to the embodiments of the present disclosure, in order to ensure distribution uniformity of the slits 04, the longitudinal slits 041 of the touch electrodes 03 have the same length; and/or the horizontal slits 042 in the touch electrodes 03 have the same length.

Preferably, in the in-cell touch screen according to embodiments of the present disclosure, in order to ensure distribution uniformity of the slits 04, the horizontal slits 042 of have the same arrangement pattern for all of the touch electrodes 03, and/or the longitudinal slits 041 have the same arrangement pattern for the all of the touch electrodes 03. In other words, the arrangement pattern formed by the longitudinal slits and/or the horizontal slits in one of the touch electrodes is the same as that in other ones of the touch electrodes. For example, the horizontal slits in all the touch electrodes may have the same shape (such as, length, width), have the same relative positions with respective to the touch electrodes or the pixels, or may be aligned with each other in the column direction the horizontal slits in each of the touch electrodes may be spaced from one another by the same distance, or the like; similarly, the longitudinal slits in all the touch electrodes have the same shape (for example, width, length), have the same relative positions with respect to the touch electrodes or the pixels, or may be aligned with each other in the row direction, or the longitudinal slits in each of the touch electrodes may be spaced from one another by the same distance, or the like; and/or the horizontal slits and the longitudinal slits have the same shape, or the like.

Preferably, in the in-cell touch screen according to embodiment of the present disclosure, in order to simplify the manufacturing process, the plurality of touch electrodes 03 that are independent of one another are generally arranged in the same layer. As such, a pattern of the touch electrodes 03 may be formed through a single patterning process, thereby simplifying manufacturing process and reducing product cost. Of course, the touch electrodes 03 may be formed in multiple layers, which is not limited herein.

Further, in practice, the in-cell touch screen according to embodiments of the present disclosure is not only applicable to a twisted nematic (TN) type liquid crystal display screen, but also to an advanced dimension switch (ADS) type liquid crystal display screen, a high-advanced dimension switch (HADS) type liquid crystal display screen with a high aperture ratio and an in-plane switch (IPS) type liquid crystal display screen.

Further, the in-cell touch screen according to embodiments of the present disclosure is particularly applicable to the HADS liquid crystal display screen, in which a common electrode having a slit electrode structure double as the touch electrodes 03. That is, the touch electrodes 03 form the common electrode layer located on the side of the lower substrate facing the upper substrate. In this instance, a touch control function may be achieved by dividing the common electrode layer into the touch electrodes based on the processes of manufacturing the lower substrate 01 in prior art without adding additional process, thereby reducing manufacturing cost and increasing production efficiency.

Generally, a touch point density of a touch screen is in order of millimeter. Thus, in practice, a density and an occupying area of the touch electrodes may be configured according to the touch point density as required. For example, each touch electrodes is designed as a square electrode with sizes of 5 mm×5 mm. As a display density of a display screen is often in order of micron, one touch electrode may generally correspond to a plurality of pixel in the display screen.

Further, based on the operation principle of a touch screen, the mutual capacitance principle may be implemented in the touch screen according to embodiments of the present disclosure, such that the touch electrodes having above described structure are classified into or comprise touch driving electrodes and touch sensing electrodes, or, are configured as touch driving electrodes and touch sensing electrodes are further provided in a layer which is different from the layer where the touch driving electrodes are located. Or, the touch electrodes having above described structures is configured as a self-capacitance electrode based on the self-capacitance principle.

The common electrode layer doubles as the touch electrodes of the touch screen provided by the embodiments of the present disclosure, thus in practice, a time-sharing drive method for a touch stage and a display stage is implemented in order to reduce interference between a display signal and a touch signal, and a display driving chip and a touch detection chip may be integrated as a single chip in practice so as to further reduce production cost.

Figure 5A:
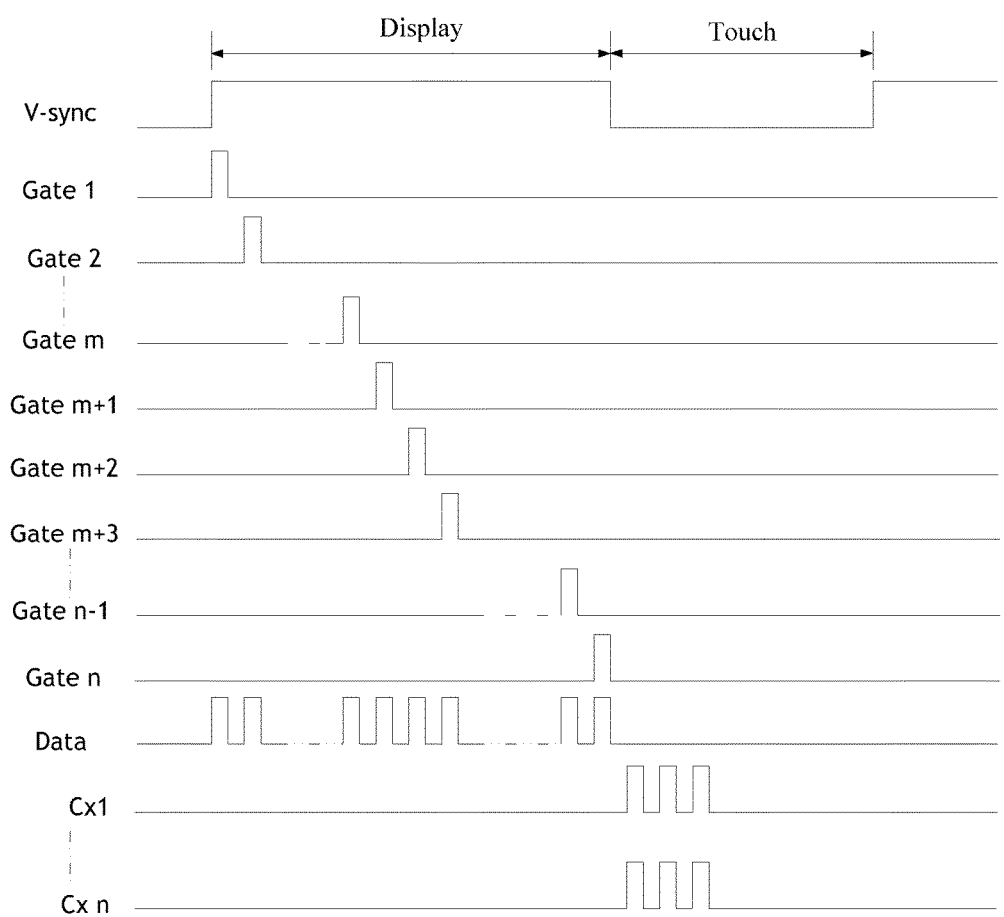
FIG. 5a is a schematic view showing a timing of driving an in-cell touch screen according to an exemplary embodiment of the present disclosure.
Figure 5B:
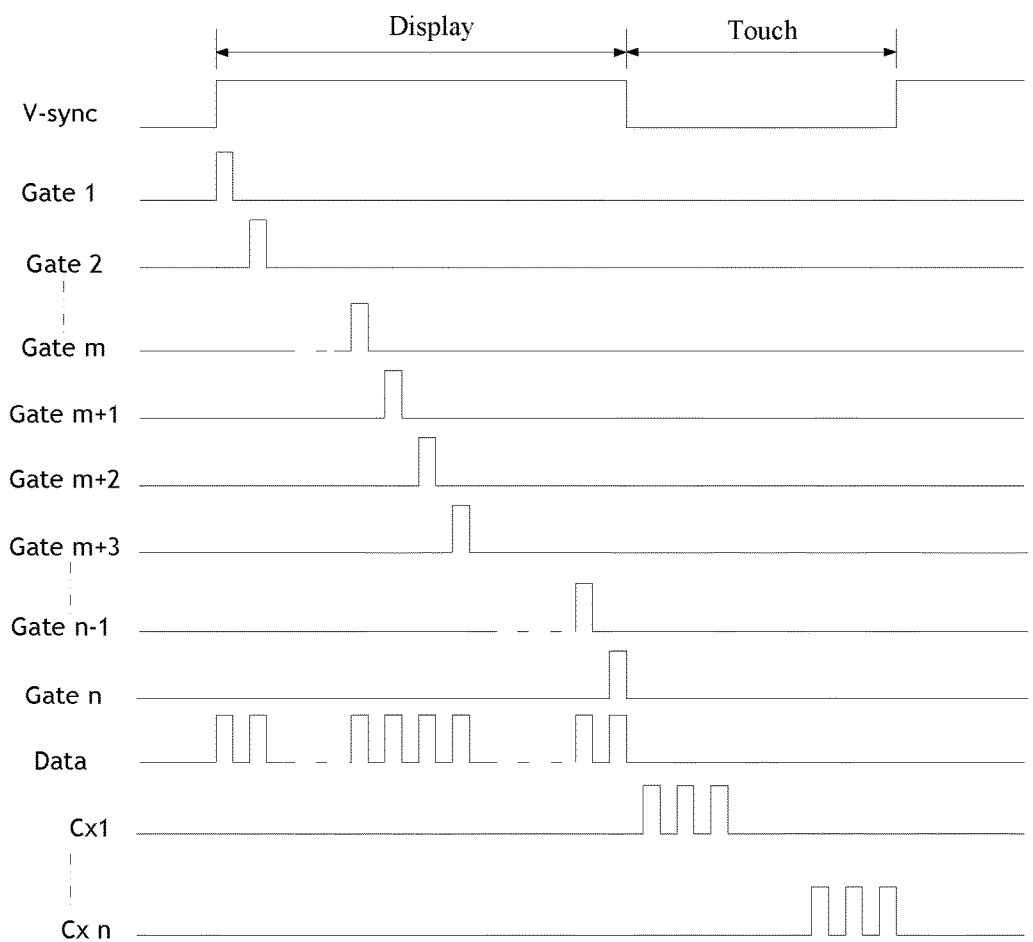
FIG. 5b is a schematic view showing a timing sequence of driving an in-cell touch screen according to another exemplary embodiment of the present disclosure.

For example, in the driving time sequence charts shown FIGS. 5*a* and 5*b*, a period of time (V-sync) during which each frame of image is displayed by the touch screen is divided into a display period (Display) and a touch period (Touch). For example, in the driving time sequence chart shown FIGS. 5*a* and 5*b*, the period of time for displaying one frame of image by the touch screen is 16.7 ms, in which a period of 5 ms is selected as the touch period and the remained period of 11.7 ms is used as the display period. The two periods may be suitably adjusted according to processing ability of IC chip and will not particularly limited herein. During the display period (Display), a gate scanning signal is applied in turn to each of gate signal lines, i.e., Gate1, Gate2 . . . Gate n, of the touch screen, grey scale signals are applied to data signal lines, and a common electrode signal is applied to the respectively touch electrodes Cx1 . . . Cxn, thereby achieving display function of the liquid crystal display device.

During the touch period (Touch) shown in FIG. 5*a*, as an example where the touch electrode is used as a self-capacitance electrode, driving signals may be applied to respective touch electrodes, Cx1 . . . Cxn simultaneously, while feedback signals are received from the respective touch electrodes Cx1 . . . Cxn. Alternatively, as shown in FIG. 5*b*, driving signals may be applied to respective touch electrodes Cx1 . . . Cxn in turn or sequentially, while feedback signals are received from the touch respective electrodes Cx1 . . . Cxn in turn or sequentially. The touch operation of the touch screen will not be limited herein. Then, the feedback signals are analysized to determine whether or not a touch operation occurs, thereby achieving a touch control function.

Further, in order to simplify manufacturing process and reduce manufacturing cost, in the in-cell touch screen according to embodiments of the present disclosure, the strip-shaped floating electrode 05 connected with the touch electrode 03 may be arranged in the same layer as and insulated from a data line 07 or a gate line on the lower substrate. In this way, during manufacturing, the strip-shaped floating electrode 05 may be formed in the same layer as the data line 07 or the gate line, such that no new process is needed and only a modification to a pattern of a corresponding layer is needed, thereby simplifying process steps, reducing manufacturing cost and increasing manufacturing efficiency. Further, as the strip-shaped floating electrode is made of the same conductive material as the data line or the gate line, a resistance of the touch electrode that is connected with the strip-shaped floating electrode may be reduced.

Further, as the touch electrodes 03 in the touch screen according to the embodiments of the present disclosure comprise not only the longitudinal slits 041 but also the horizontal slits 042, the strip-shaped floating electrode may correspondingly comprise: longitudinal floating electrodes that are arranged at positions corresponding to the longitudinal slits 041 and/or to the gaps between the two adjacent touch electrodes 03 arranged in the row direction; and/or horizontal floating electrodes that are arranged at positions corresponding to the horizontal slits 042 and/or to the gaps between the two adjacent touch electrodes 03 arranged in the column direction. FIGS. 2 and 4 only illustrate the structural schematic views of the longitudinal floating electrodes which are arranged at positions corresponding to the longitudinal slits 041.

Further, in practice, the number of the strip-shaped floating electrodes 05 may be as large as possible, such that the strip-shaped floating electrodes 05 fill the slits of the touch electrodes 03 as possible so as to increase the effective area of the touch electrodes 03. Moreover, as shown in FIGS. 2 and 4, each strip-shaped floating electrode 05 may be arranged to be not overlapped with others touch electrodes 03 except the touch electrode that is electrically connected with the strip-shaped floating electrode, i.e., a length of each strip-shaped floating electrode 05 is the same as a length of the touch electrode 03 that is electrically connected with the strip-shaped floating electrode, such that a plurality of the strip-shaped floating electrodes 05, which are arranged in a straight line and are connected with different touch electrodes 03, may be provided, in order to increase the effective area of the touch electrodes 03.

Further, as shown in FIG. 2, the touch screen according to the embodiment of the present disclosure may further include signal lines 08 that are arranged at positions corresponding to other longitudinal slits 041 than the longitudinal slits where the longitudinal floating electrodes are arranged, and/or at positions corresponding to other gaps between two adjacent touch electrodes 03 arranged in the row direction, than the gaps where the longitudinal floating electrodes are arranged. In other examples, the touch screen may further include another signal lines 08 that are arranged at positions corresponding to other horizontal slits than the horizontal slits where the horizontal floating electrodes are arranged, and/or at positions corresponding to other gaps between two adjacent touch electrodes 03 arranged in the column direction, than the gaps where the horizontal floating electrodes are arranged. In other words, the signal line 08 may be arranged at the position corresponding to the slit 04 where no floating electrode is arranged and/or at the position corresponding to the gap between two adjacent touch electrodes 03 where no floating electrode is arranged. The signal lines 08 are connected with respective touch electrodes 03 in a one-to-one correspondence and configured to load corresponding electricals signal to the touch electrodes 03 connected therewith.

Based on the same concept, an embodiment of the present disclosure further provides a display device, comprising the in-cell touch screen according to the above embodiments. The display device may be a mobile phone, a tablet computer, a television, a display, a notebook computer, a digital photo frame, a navigator or any other product or component that has a display function. Implementation of the display device may refer to the above embodiments of the in-cell touch screen and the duplicating description is not repeated.

Embodiments of the present disclosure provide the in-cell touch screen and the display device, in which the touch electrodes of the touch screen are provided with the slits at the regions corresponding to the gaps between the two adjacent pixels so as to ensure uniform distribution of the slits in the touch electrodes and the gaps between the touch electrodes and further to avoid defective problems of bright line or dark line appearing in the in-cell touch screen. Further, the touch screen is further provided with the strip-shaped floating electrode that is electrically connected with the touch electrodes. The strip-shaped floating electrodes is arranged at the position corresponding to the slit in the touch electrodes and/or at the position corresponding to the gap between two adjacent touch electrodes. The strip-shaped floating electrode at least partially fills or covers the slit in the touch electrodes, thus the problem that the effective area of the touch electrode is reduced due to provision of the slits in the touch electrode may be alleviated.

It will be understood by those skilled in the art that various changes and modifications may be made therein without departing from the spirit of the present disclosure, and are intended to be included in scope of the invention provided that they fall into the scope claimed by the attached claims or its equivalent.

What is claimed is:

1. An in-cell touch screen, comprising
   an upper substrate and a lower substrate that are arranged to face each other, and
   a plurality of touch electrodes that are independent of one another and arranged on a side of the lower substrate facing the upper substrate or on a side of the upper substrate facing the lower substrate; wherein,
   each touch electrode corresponds to a plurality of pixels in the touch screen and is provided with a slit at a position corresponding to a gap between two adjacent pixels; and
   the touch screen further comprises a strip-shaped floating electrode that is electrically connected with a corresponding one of the touch electrodes and is arranged at a position corresponding to the slit of the corresponding touch electrode and/or at a position corresponding to a gap between two adjacent touch electrodes.

2. The in-cell touch screen as claimed in claim 1, wherein the slit comprises a longitudinal slit corresponding to the gap between two adjacent pixels arranged in a row direction and a horizontal slit corresponding to the gap between two adjacent pixels arranged in a column direction.

3. The in-cell touch screen as claimed in claim 2, wherein
   a width of the longitudinal slit is equal to a width of the gap between two adjacent columns of touch electrodes; and/or,
   a width of the horizontal slit is equal to a width of the gap between two adjacent rows of touch electrodes.

4. The in-cell touch screen as claimed in claim 2, wherein an arrangement pattern of the longitudinal slits is configured to be the same in all the touch electrodes and/or an arrangement pattern of the horizontal slits is configured to be the same in all the touch electrodes.

5. The in-cell touch screen as claimed in claim 1, wherein,
   all the touch electrodes form a common electrode layer located on the side of the lower substrate facing the upper substrate; and
   the strip-shaped floating electrode is arranged in the same layer as and insulated from a data line or a gate line on the lower substrate.

6. The in-cell touch screen as claimed in claim 2, wherein the strip-shaped floating electrode comprises:
   a longitudinal floating electrode arranged at a position corresponding to the longitudinal slit and/or at a position corresponding to the gap between two adjacent touch electrodes arranged in the row direction; and/or
   a horizontal floating electrode arranged at a position corresponding to the horizontal slit and/or at a position corresponding to the gap between two adjacent touch electrodes arranged in the column direction.

7. The in-cell touch screen as claimed in claim 2, wherein the strip-shaped floating electrode is not overlapped with other touch electrodes, except the touch electrode that is electrically connected with the strip-shaped floating electrode.

8. The in-cell touch screen as claimed in claim 2, further comprising:
   signal lines that are arranged at positions corresponding to other longitudinal slits than the longitudinal slits where the longitudinal floating electrodes are arranged and/or at positions corresponding to other gaps between two adjacent touch electrodes arranged in the row direction than the gaps where the longitudinal floating electrodes are arranged, the signal lines being connected with the touch electrodes in a one-to-one correspondence and configured to load corresponding electrical signals to the touch electrodes connected therewith.

9. The in-cell touch screen as claimed in claim 1, wherein,
   the touch electrodes comprise touch driving electrodes and touch sensing electrodes; or
   the touch electrodes are configured as self-capacitance electrodes; or
   the touch electrodes are configured as touch driving electrodes, and the touch screen further comprises touch sensing electrodes arranged in a layer which is different from the layer where the touch driving electrodes are located.

10. A display device, comprising the in-cell touch screen as claimed in claim 1.

11. The in-cell touch screen as claimed in claim 2, wherein,
    all the touch electrodes form a common electrode layer located on the side of the lower substrate facing the upper substrate; and
    the strip-shaped floating electrode is arranged in the same layer as and insulated from a data line or gate line on the lower substrate.

12. The in-cell touch screen as claimed in claim 3, wherein,
    all the touch electrodes form a common electrode layer located on the side of the lower substrate facing the upper substrate; and
    the strip-shaped floating electrode is arranged in the same layer as and insulated from a data line or a gate line on the lower substrate.

13. The in-cell touch screen as claimed in claim 4, wherein,
    all the touch electrodes form a common electrode layer located on the side of the lower substrate facing the upper substrate; and
    the strip-shaped floating electrode is arranged in the same layer as and insulated from a data line or a gate line on the lower substrate.

14. The in-cell touch screen as claimed in claim 3, wherein the strip-shaped floating electrode is not overlapped with other touch electrodes, except the touch electrode that is electrically connected with the strip-shaped floating electrode.

15. The in-cell touch screen as claimed in claim 4, wherein the strip-shaped floating electrode is not overlapped with other touch electrodes, except the touch electrode that is electrically connected with the strip-shaped floating electrode.

16. The in-cell touch screen as claimed in claim 5, wherein the strip-shaped floating electrode is not overlapped with other touch electrodes, except the touch electrode that is electrically connected with the strip-shaped floating electrode.

17. The in-cell touch screen as claimed in claim 6, wherein the strip-shaped floating electrode is not overlapped with other touch electrodes, except the touch electrode that is electrically connected with the strip-shaped floating electrode.

18. The in-cell touch screen as claimed in claim 3, further comprising;
    signal lines that are arranged at the positions corresponding to other longitudinal slits than the longitudinal slits where the longitudinal floating electrodes are arranged and/or at positions corresponding to other gaps between two adjacent touch electrodes arranged in the row direction than the gaps where the longitude floating electrodes floating electrodes are arranged, the signal lines being connected with the touch electrodes in a one-to-one correspondence and configured to load corresponding electrical signals to the touch electrodes connected therewith.

19. The in-cell touch screen as claimed in claim 4, further compromising:
    signal lines that are arranged at the positions corresponding to other longitudinal slits than the longitudinal slits where the longitudinal floating electrodes are arranged and/or at positions corresponding to other gaps between two adjacent touch electrodes arranged in the row direction than the gaps where the longitude floating electrodes floating electrodes are arranged, the signal lines being connected with the touch electrodes in a one-to-one correspondence and configured to load corresponding electrical signals to the touch electrodes connected therewith.

20. The in-cell touch screen as claimed in claim 6, further comprising:
    signal lines that are arranged at the positions corresponding to other longitudinal slits than the longitudinal slits where the longitudinal floating electrodes are arranged and/or at positions corresponding to other gaps between two adjacent touch electrodes arranged in the row direction than the gaps where the longitude floating electrodes floating electrodes are arranged, the signal lines being connected with the touch electrodes in a one-to-one correspondence and configured to load corresponding electrical signals to the touch electrodes connected therewith.

\* \* \* \* \*